United States Patent [19]

Ailett et al.

[11] 3,881,099

[45] Apr. 29, 1975

[54] PSEUDO-RANDOM BINARY SEQUENCE GENERATOR

[75] Inventors: Claude Ailett; Jacques Bigou, both of Lannion; Yves Bretecher, Perros-Guirec, all of France

[73] Assignee: Societe Lannionaise d'Electronique Sle-Citerel, Lannion, France

[22] Filed: Dec. 17, 1973

[21] Appl. No.: 425,566

[30] Foreign Application Priority Data

Dec. 15, 1972 France .............................. 72.44868

[52] U.S. Cl....... 235/152; 179/15 AV; 179/15.55 R

[51] Int. Cl. ............................................. G06f 1/02

[58] Field of Search............... 235/152; 179/15 AV, 235/15.55 R; 340/347 DD; 331/78

[56] References Cited

UNITED STATES PATENTS 3,594,509 6/1971 Shimamura .................... 179/15 AV
3,609,327 9/1971 Paine ................................ 235/152
3,751,648 8/1973 Wu .................................... 235/152

*Primary Examiner*—Felix D. Gruber
*Assistant Examiner*—David H. Malzahn
*Attorney, Agent, or Firm*—Craig & Antonelli

[57] ABSTRACT

The invention comes within the branch of equipment used for controlling digital operation systems, for example, pulse code modulation telephonic transmission systems.

It concerns a random sequence generator operating at a frequency which is a multiple of the frequency of a generator of known type, comprising a time multiplexer in functional connection with the said generator of known type.

It is used in services for the studying and maintenance of digital operation systems.

16 Claims, 4 Drawing Figures

PSEUDO-RANDOM BINARY SEQUENCE GENERATOR

The invention comes within the branch of equipment used for controlling digital operating systems, for example, pulse code telephone transmission systems. It concerns a generator for quasi-random sequences operating at a higher frequency than known generators.

It is a known method to use, for controlling the operation of electronic equipment of the digital type, sequences of binary signals whose repetition period is very long and which may be considered as pseudo-random sequences. Such a sequence is constituted by a sequence of bits passing at a clock rhythm. It is obtained in a cyclic counter often constituted by a shift register having $k$ flip-flops, which supplies a morphologically random sequence whose extension is $2^k - 1$. Starting from a predetermined original state, the sequence passes during $2^k - 1$ clock instants. The clock instant whose order is $2^k$ induces the original state and the sequence begins again.

It is known how to generate such a sequence of $2^k - 1$ bits, for example, by means of a shift register comprising $k$ flip-flops, in which the output of the last one is looped on the input of the first, the outputs of certain flip-flops being grouped at the input of EXCLUSIVE OR circuits (sum modulo 2), whose output is connected to the input of one of the other flip-flops of the register.

The internal connections thus established, taken as a whole, define what is called the "characteristic polynomial" of the pseudo-random sequence generator. These polynomials, having the form of $1 + x^p + x^q + x^r \ldots$ where $p, q, r \ldots$ are integers, must be non-reducible (that is, not have any root on the bodies of the modulo 2 integers), primitive (that is, give $2^k - 1$ different remainders in the operation as a divider of any polynomial). They may have the minimum of terms (to simplify the circuitry and with a view to standardization of the sequences). The search for the latter is difficult. Moreover, tables which have been complied after systematic research on the cyclic codes are used (see, more particularly, "Error Correcting Codes," W. W. Peterson, MIT Press, Cambridge, U.S.A. (1965) ).

In known devices, mentioned hereinabove, the rhythm of the bits at the output of the register is equal to the clock frequency applied to the advance line of the shift register. The maximum frequency of the sequence obtained at the output is therefore limited by the maximum rhythm permitted by the flip-flops of the shift register.

To overcome that limitation, it is a known practice (through U.S. Pat. No. 3,678,507, for example) to combine the maximum-length shift register with a delay circuit whose delay is half the repetition period and with a multiplexer. The latter alternatively connects up the direct output of the register and the output of the delay circuit to a common circuit which therefore sends out the maximum-length sequence at a speed which is doubled in relation to the shift speed of the register. It has also. been contrived (for example, through German Patent Application published under No. 2,131,783) to triple the output speed by using two delay lines one of which corresponds to a third of the repetition period and the other of which corresponds to two thirds thereof.

The invention aims at producing a maximum-length sequence generator whose frequency is, as in known devices, a multiple of the shift frequency of the original counter but which obtains this result without the use of delay lines which, as is known, set problems relating to accuracy in the case of great delays. Now, these delays are always greaat in a pseudo-random sequence generator because of the length of the repetition periods.

Starting with a maximum-length binary sequence generator which comprises a counter fitted up to effect cyclic counting at a frequency F and a time multiplexer sending out the output sequence at a frequency $q$F based on input sequences derived from the said counter, the invention is characterized in that the said input sequences are directly extracted from the different stages of the said counter and/or by linear combination of the outputs of certain stages of the said counter in "sum modulo 2" circuits, the choice of stages and combinations being defined by the required output sequence.

In a preferred embodiment of the invention, the counter is fitted up to send out sequences of the same maximum length as the sequence coming from the multiplexer. In that case, these sequences may all be identical. The shifting of the sequences in the various stages may be chosen such that all the sequences to be multiplexed are directly available in the coupler, this making it possible to dispense with the "modulo 2" circuits.

Alternatively, a cyclic counter whose capacity is a submultiple of the length of the sequence coming from the multiplexer may be used. In that case, the sequences coming from the stages of the counter may also be identical to one another and they may also be chosen so as to be able to feed directly the multiplexer.

In practice, the cyclic counter is constituted preferably by a shift register, looped by a sum modulo 2 circuit. It may be produced in two different ways:

1. The flip-flops whose order is $1, 2, \ldots i \ldots k$ are connected from one to the next. For a characteristic polynomial having $n$ terms, such a basic register comprises $(n-2)$ sum modulo 2 circuits incorporated in the structure of the register. In that case, extraction is effected on the one hand directly on the output of a flip-flop of the register and on the other hand by grouping two or several flip-flop outputs at the input of $(q-1)$ sum modulo 2 circuits, that is, in all, $q$ outputs of the fitted up register, which are applied to $q$ inputs of a time multiplexer deriving its rhythm from $q$F. That type of fitted up register is suitable for values of $q = 2^h$, integer $h$.

2. The flip-flops of the basic register are connected together at every $q$. The fitted up register then comprises $q$ sum modulo 2 circuits, incorporated in its structure. Extraction is effected directly at the outputs of $q$ flip-flops of the register, which are connected up to $q$ inputs of a time multiplexer deriving its rhythm $q$F. That type of fitted up register is suitable for any $q$.

To obtain at the inputs of the time multiplexer sequences identical to the reference sequence but phase shifted by a deviation $s, 2s, \ldots$ (where $s = 2^k/q$) the position and the interconnections of the sum modulo 2 circuits must be established following certain rules which will be exposed herebelow.

These rules are based on the establishing of a matrix table of $k \times k$ terms, corresponding to the states of the $k$ flip-flops of the basic register existing after a certain number of clock instants after a predetermined original state (first line of $k$ terms) and after each of the $(k - 1)$ following clock instants: this being in all $k$ lines of $k$ terms each.

The interconnections of the sum modulo 2 circuit exterior to the register (first type) or incorporated in the register (second type) are effected as a function of the 1's which exist in the column corresponding to one of the flip-flops, taken as a reference.

To make it easier to understand the method for determining the interconnections, typical examples of random generators of random sequences at accelerated frequencies will be given in the following figures, among which:

Figure 1:
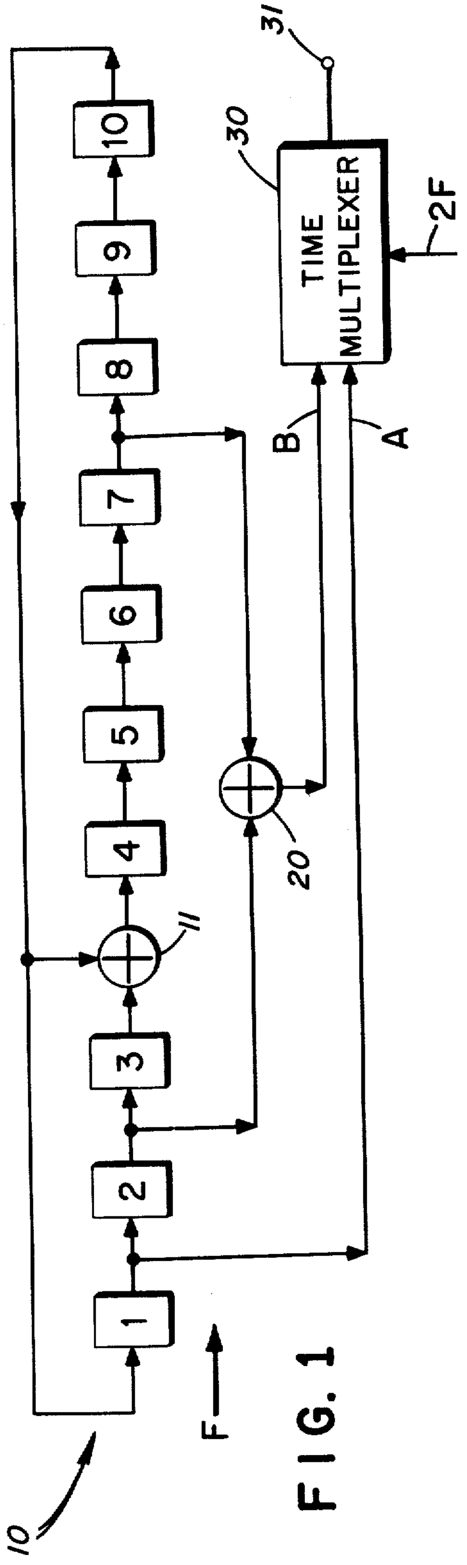
FIG. 1 shows a register of the first type having 10 flip-flops fitted up so as to supply, at the output of a time multiplexer, a pseudo-random sequence passing at a frequency twice that of the basic register.

FIG. 1 — The basic shift register 10 having 10 flip-flops numbered 1 to 10 is arranged according to a characteristic polynomial $1 + x^3 + x^{10}$.

The result of this is a configuration comprising a looping of 10 at 1 and a sum modulo 2 circuit 11, between 3 and 4, connected up to the output of 3 and to the output of 10. That register has an advance line which receives clock pulses having a frequency of F.

In order not to over-burden the figure, the advance line has not been drawn. The rhythm F has been marked to the left with an arrow. That symbol has been adopted for the four figures.

With its 10 flip-flops, the register 10 provides a sequence of $(2^k - 1) = 1{,}023$ terms.

To obtain a sequence having a double frequency 2F, two sequences must be applied to the inputs of a time multiplexer 30 having an output 31, the one A being extracted for example, from the flip-flop 1, the other, B, being extracted from a sum modulo 2 circuit 20, which receives the output of 2 and the output of 7, these connections of the circuit 20 being determined by application of the following rule:

Between A and B, a dephasing $s = 2^9 = 512$ is required to be created.

For that purpose, starting from a predetermined original code, for example, 1 0 0 0 0 0 0 0 0 0, the code is determined after 512 clock instants. This is effected conveniently, for example, on a suitable programmed calculator.

Then, a further $(k-1) = 9$ shifts are effected. The $k = 10$ codes obtained are grouped line by line so as to constitute a matrix Table I comprising $k \times k$ terms.

TABLE I

| | | | | | | | | | |
|---|---|---|---|---|---|---|---|---|---|
| 0 | 0 | 1 | 0 | 1 | 0 | 0 | 0 | 0 | 1 |
| 1 | 0 | 0 | 0 | 0 | 1 | 0 | 0 | 0 | 0 |
| 0 | 1 | 0 | 0 | 0 | 0 | 1 | 0 | 0 | 0 |
| 0 | 0 | 1 | 0 | 0 | 0 | 0 | 1 | 0 | 0 |
| 0 | 0 | 0 | 1 | 0 | 0 | 0 | 0 | 1 | 0 |
| 0 | 0 | 0 | 0 | 1 | 0 | 0 | 0 | 0 | 1 |
| 1 | 0 | 0 | 1 | 0 | 1 | 0 | 0 | 0 | 0 |
| 0 | 1 | 0 | 0 | 1 | 0 | 1 | 0 | 0 | 0 |
| 0 | 0 | 1 | 0 | 0 | 1 | 0 | 1 | 0 | 0 |
| 0 | 0 | 0 | 1 | 0 | 0 | 1 | 0 | 1 | 0 |

If the reference output of the generator (basic register) is taken on the flip-flop whose order is $n$, the position of the 1's in the column whose order is $n$ gives the list of the outputs to be summed according to modulo 2 to obtain the shifted sequence of $s$ in relation to the reference flip-flop.

If the first flip-flop is taken as a reference output (A), it will be seen that the first column of the matrix contains 1's in the second and seventh positions. Hence, the connection of the inputs of 20 with 2 and 7 respectively. The output A of the first flip-flop and the output B of 20 are connected to the time multiplexer 30, whose output 31 supplies, at a rhythm of 2F the pseudo-random sequence generated by the shift register 10 having a frequency of F.

Figure 2:
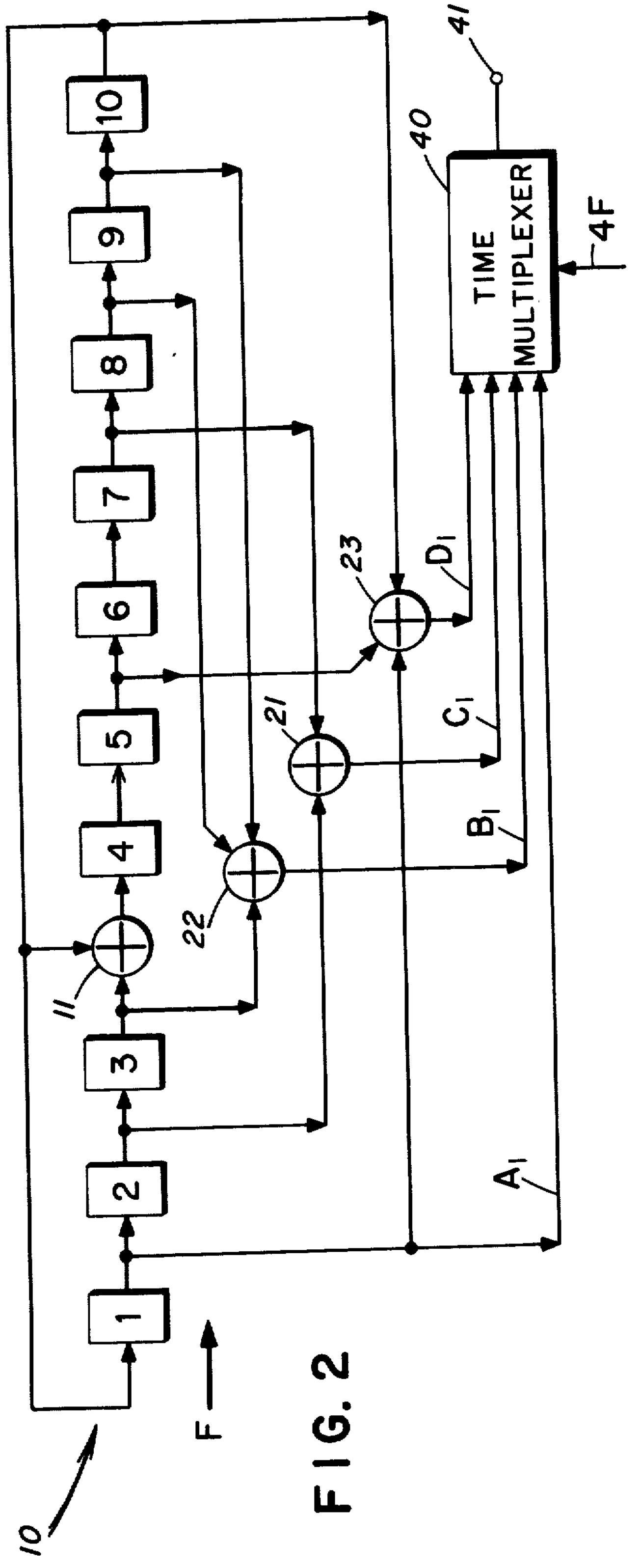
FIG. 2 shows the same register fitted up so as to provide a pass at a four-fold frequency.

FIG. 2 — The basic shift register responding to the same characteristic polynomial is wired up in the same way as in FIG. 1. It derives its rhythm from a clock F.

To obtain a quadrupling of the frequency, the following method is used:

Besides the matrix Table I above, a second Table II having the same dimensions is constituted starting from the instant 256 and a third Table III having the same dimensions is constituted starting from the instant 768.

TABLE II

| | | | | | | | | | |
|---|---|---|---|---|---|---|---|---|---|
| 0 | 1 | 1 | 1 | 0 | 0 | 0 | 0 | 1 | 0 |
| 0 | 0 | 1 | 1 | 1 | 0 | 0 | 0 | 0 | 1 |
| 1 | 0 | 0 | 0 | 1 | 1 | 0 | 0 | 0 | 0 |
| 0 | 1 | 0 | 0 | 0 | 1 | 1 | 0 | 0 | 0 |
| 0 | 0 | 1 | 0 | 0 | 0 | 1 | 1 | 0 | 0 |
| 0 | 0 | 0 | 1 | 0 | 0 | 0 | 1 | 1 | 0 |
| 0 | 0 | 0 | 0 | 1 | 0 | 0 | 0 | 1 | 1 |
| 1 | 0 | 0 | 1 | 0 | 1 | 0 | 0 | 0 | 1 |
| 1 | 1 | 0 | 1 | 1 | 0 | 1 | 0 | 0 | 0 |
| 0 | 1 | 1 | 0 | 1 | 1 | 0 | 1 | 0 | 0 |

TABLE III

| | | | | | | | | | |
|---|---|---|---|---|---|---|---|---|---|
| 1 | 1 | 0 | 0 | 0 | 0 | 1 | 0 | 0 | 0 |
| 0 | 1 | 1 | 0 | 0 | 0 | 0 | 1 | 0 | 0 |
| 0 | 0 | 1 | 1 | 0 | 0 | 0 | 0 | 1 | 0 |
| 0 | 0 | 0 | 1 | 1 | 0 | 0 | 0 | 0 | 1 |
| 1 | 0 | 0 | 1 | 1 | 1 | 0 | 0 | 0 | 0 |
| 0 | 1 | 0 | 0 | 1 | 1 | 1 | 0 | 0 | 0 |
| 0 | 0 | 1 | 0 | 0 | 1 | 1 | 1 | 0 | 0 |
| 0 | 0 | 0 | 1 | 0 | 0 | 1 | 1 | 1 | 0 |
| 0 | 0 | 0 | 0 | 1 | 0 | 0 | 1 | 1 | 1 |
| 1 | 0 | 0 | 1 | 0 | 1 | 0 | 0 | 1 | 1 |

On locating the 1's in column 1, it is found that:

in Table I — there is a 1 in positions 2 and 7 (as above);

In Table II — there is a 1 in positions 3, 8, and 9;

In Table III — there is a 1 in positions 1, 5, and 10.

A configuration according to FIG. 2, with a circuit 21 connected to 2 and to 7 (output $C_1$), a circuit 22 connected to 3, 8, and 9 (output $B_1$) a circuit 23 connected to 1, 5, and 10 (output $D_1$) are immediately deduced therefrom.

A time multiplexer having four inputs 40, receiving $A_1$ (output of 1), $B_1$, $C_1$, $D_1$, provides at 41 a sequence identical to the preceding at a quadruple frequency 4F.

Figure 3:
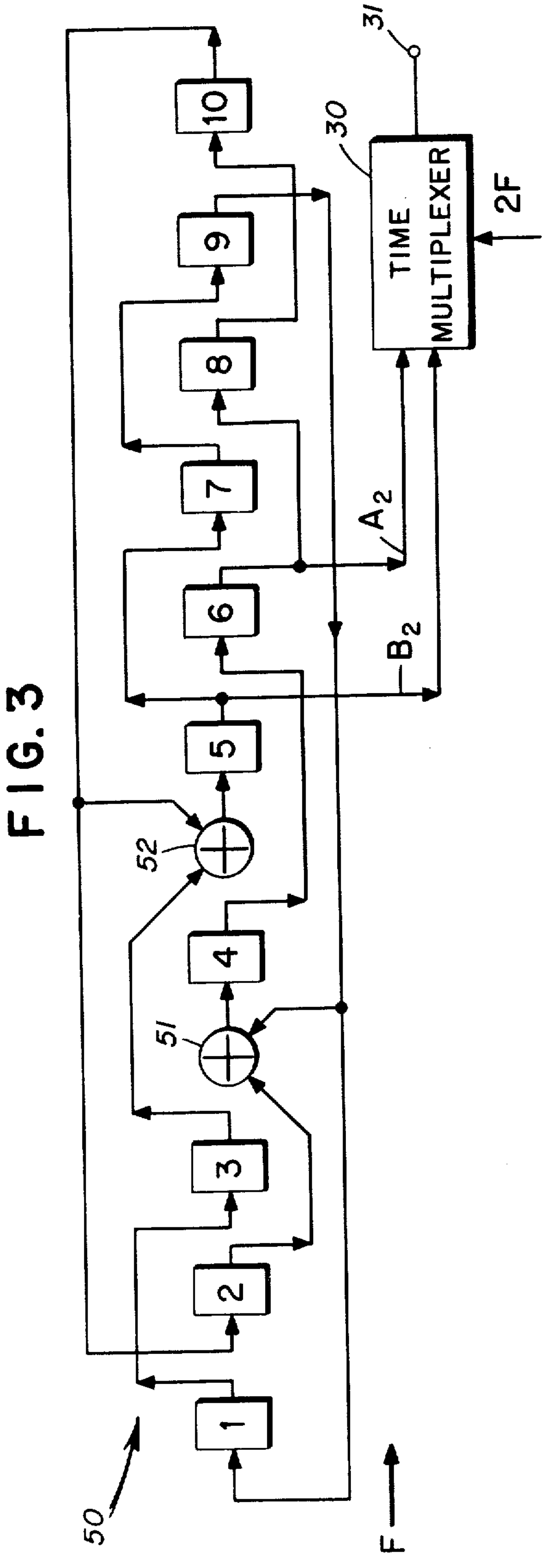
FIG. 3 shows a register of the second type providing a pass at double speed.
Figure 4:
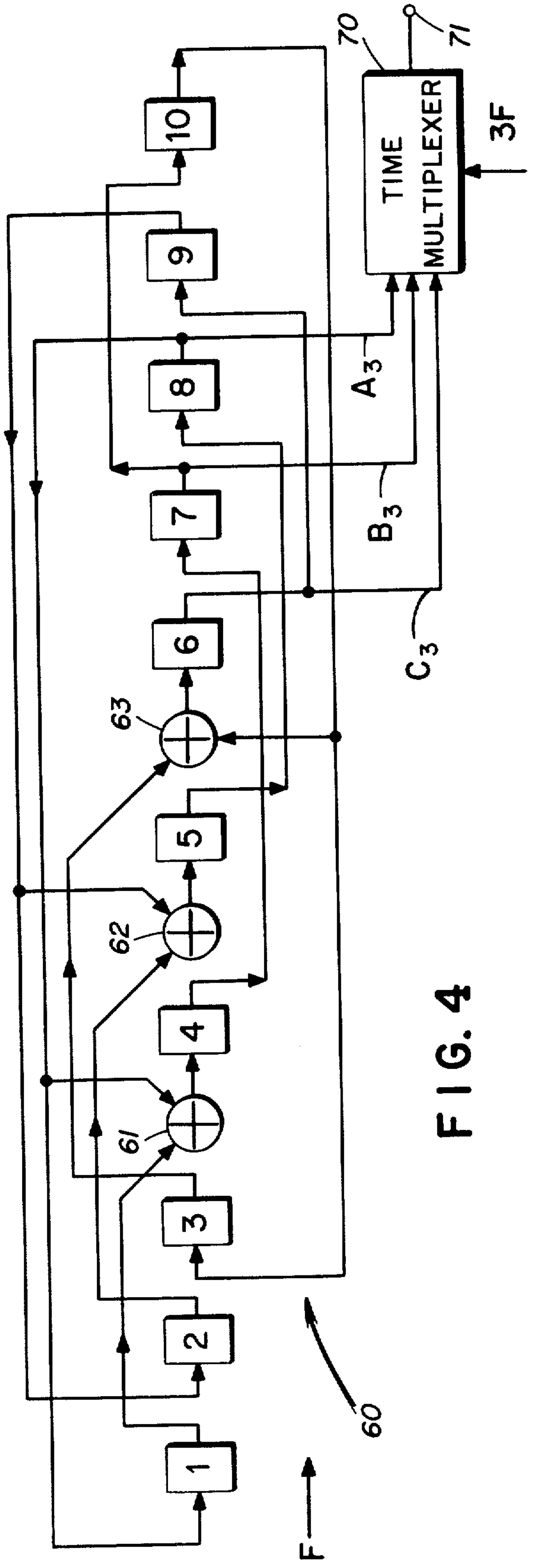
FIG. 4 shows a register of the second type providing a pass at triple frequency.

FIG. 3 — In that figure, as in FIg. 4, the basic register is replaced by a "jump" register where the flip-flops are connected at every $q$. The same number of flip-flops, that is, 10, and the same characteristic polynomial have been kept.

Where $q = 2$, starting with the same original code as previously, for example, (1 0 0 0 0 0 0 0 0 0), a matrix table is constituted taking as a first line the code at the instant $q = 2$, plus nine codes at the instants 3 to 11, respectively.

Table a

| | | | | | | | | | |
|---|---|---|---|---|---|---|---|---|---|
| 0 | 0 | 1 | 0 | 0 | 0 | 0 | 0 | 0 | 0 |
| 0 | 0 | 0 | 1 | 0 | 0 | 0 | 0 | 0 | 0 |
| 0 | 0 | 0 | 0 | 1 | 0 | 0 | 0 | 0 | 0 |
| 0 | 0 | 0 | 0 | 0 | 1 | 0 | 0 | 0 | 0 |
| 0 | 0 | 0 | 0 | 0 | 0 | 1 | 0 | 0 | 0 |
| 0 | 0 | 0 | 0 | 0 | 0 | 0 | 1 | 0 | 0 |
| 0 | 0 | 0 | 0 | 0 | 0 | 0 | 0 | 1 | 0 |
| 0 | 0 | 0 | 0 | 0 | 0 | 0 | 0 | 0 | 1 |

Table a-Continued

| | | | | | | | | | |
|---|---|---|---|---|---|---|---|---|---|
| 1 | 0 | 0 | 1 | 0 | 0 | 0 | 0 | 0 | 0 |
| 0 | 1 | 0 | 0 | 1 | 0 | 0 | 0 | 0 | 0 |

Here, all the columns of the table are used (instead of only one previously). Column by column, the 1's are located, these being the sign of an interconnection concerning the flip-flop having the order of a column with the flip-flops having for their orders the positions of the 1's in the same column.

Here, the following is observed:

Flip-flop 1 receives the output of 9;
Flip-flop 2 receives the output of 10;
Flip-flop 3 receives the output of 1;
Flip-flop 4 receives the output of 2 ⊕ 9 (circuit 51);
Flip-flop 5 receives the output of 3 ⊕ 10 (circuit 52);
Flip-flop 6 receives the output of 4;
Flip-flop 7 receives the output of 5;
Flip-flop 8 receives the output of 6;
Flip-flop 9 receives the output of 7; and
Flip-flop 10 receives the output of 8.

That configuration is produced in a register 50 with the incorporated circuits 51 and 52.

The time multiplexer having two inputs 30 identical to that in FIG. 1 receives the outputs $A_2$, $B_2$ and supplies at 31 the pseudo-random sequence having a double frequency 2F.

FIG. 4 — To obtain a tripling of the frequency, a "jump" register, whose flip-flops are connected at every 3, is used.

The same rule as in the preceding case is applied, starting from the instant 3 and for the following nine instants. The following table is thus obtained:

Table b

| | | | | | | | | | |
|---|---|---|---|---|---|---|---|---|---|
| 0 | 0 | 0 | 1 | 0 | 0 | 0 | 0 | 0 | 0 |
| 0 | 0 | 0 | 0 | 1 | 0 | 0 | 0 | 0 | 0 |
| 0 | 0 | 0 | 0 | 0 | 1 | 0 | 0 | 0 | 0 |
| 0 | 0 | 0 | 0 | 0 | 0 | 1 | 0 | 0 | 0 |
| 0 | 0 | 0 | 0 | 0 | 0 | 0 | 1 | 0 | 0 |
| 0 | 0 | 0 | 0 | 0 | 0 | 0 | 0 | 1 | 0 |
| 0 | 0 | 0 | 0 | 0 | 0 | 0 | 0 | 0 | 1 |
| 1 | 0 | 0 | 1 | 0 | 0 | 0 | 0 | 0 | 0 |
| 0 | 1 | 0 | 0 | 1 | 0 | 0 | 0 | 0 | 0 |
| 0 | 0 | 1 | 0 | 0 | 1 | 0 | 0 | 0 | 0 |

The following interconnections are deduced therefrom:

Flip-flop 1 receives the output of 8;
Flip-flop 2 receives the output of 9;
Flip-flop 3 receives the output of 10;
Flip-flop 4 receives the output of 1 ⊕ 8 (circuit 61);
Flip-flop 5 receives the output of 2 ⊕ 9 (circuit 62);
Flip-flop 6 receives the output of 3 ⊕ 10 (circuit 63);
Flip-flop 7 receives the output of 4;
Flip-flop 8 receives the output of 5;
Flip-flop 9 receives the output of 6; and
Flip-flop 10 receives the output of 7.

The corresponding configuration is produced in a register 60 with the incorporated circuits 61, 62, and 63.

A time multiplexer 70 having three inputs receiving $A_3$, $B_3$, $C_3$ provides at 71 the triple-frequency random sequence.

It should be observed that this register is recycled after 1023/3 = 341 input pulses and that the sequences on the outputs $A_3$, $B_3$, $C_3$, are distinct in relation to one another.

Although described with reference to several examples, the invention is not limited to these latter. More particularly, it is possible to choose a counter whose sequences have the same length as the sequence coming from the multiplexer but which distinguish themselves from that sequence. That case occurs if the counter is used according to FIG. 1 with a multiplexer having five inputs ($q = 5$). It is also possible to replace the shift register by a more complex counter in which the number of stages is smaller than that of the corresponding shift register.

What is claimed is:

1. A binary sequence generator comprising counter means including a plural stage shift register for effecting a cyclic counting at a frequency F, a first sum modulo 2 circuit connected between one pair of stages of said shift register and being also connected to the output of the last stage of said shift register, a second sum modulo 2 circuit having inputs connected to the outputs of other stages of said shift register than those connected to said first sum modulo 2 circuit, and a time multiplexer connected to the output of said second sum modulo 2 circuit and the output of the first stage of said shift register and receiving a multiplexing signal.

2. A binary sequence generator as defined in claim 1, wherein said first sum modulo 2 circuit is connected between the third and fourth stage of said shift register.

3. A binary sequence generator as defined in claim 2, wherein said second sum modulo 2 circuit receives inputs from the outputs of the second and seventh stages of said shift register.

4. A binary sequence generator as defined in claim 3, wherein the multiplexing signal applied to said time multiplexer has a frequency 2F.

5. A binary sequence generator as defined in claim 3, further including a third sum modulo 2 circuit having inputs connected to the outputs of the third and ninth stages of said shift register and an output connected to said time multiplexer.

6. A binary sequence generator as defined in claim 5, further including a fourth sum modulo 2 circuit having inputs connected to the outputs of the first and tenth stages of said shift register and an output connected to said time multiplexer.

7. A binary sequence generator as defined in claim 6, wherein the multiplexing signal applied to said time multiplexer has a frequency 4F.

8. A binary sequence generator comprising counter means for effecting a cyclic counting at a frequency F, including a plural stage shift register in which the output of each stage is connected to the input of the second succeeding stage; a first sum molulo 2 circuit inserted into one connection between stages and having an input connected to the input of the first stage of said shift register; a second sum modulo 2 circuit connected between other stages of said shift register than those to which said first sum modulo 2 circuit is connected and having an input connected to the last stage of said shift register; and a time multiplexer having inputs connected to two adjacent stages of said shift register and receiving a multiplexing signal.

9. A binary sequence generator as defined in claim 8, wherein said first sum modulo 2 circuit is connected between the second and fourth stages of said shift register.

10. A binary sequence generator as defined in claim 9, wherein said second sum modulo 2 circuit is connected between the third and fifth stages of said shift register.

11. A binary sequence generator as defined in claim 10, wherein the multiplexing signal applied to said time multiplexer has a frequency 2F.

12. A binary sequence generator comprising counter means for effecting a cyclic counting at a frequency F, including a plural stage shift register in which the output of each stage is connected to the input of the third succeeding stage; a first sum molulo 2 circuit inserted into one connection between stages and having an input connected to the input of the first stage of said shift register; a second sum modulo 2 circuit connected between other stages of said shift register than those to which said first sum modulo 2 circuit is connected and having an input connected to the last stage of said shift register; a third sum modulo 2 circuit connected between still other stages of said shift register and having an input connected to the output of the next to last stage of said shift register; and a time multiplexer having inputs connected to three adjacent stages of said shift register and receiving a multiplexing signal.

13. A binary sequence generator as defined in claim 12, wherein said first sum modulo 2 circuit is connected between the first and fourth stages of said shift register.

14. A binary sequence generator as defined in claim 13, wherein said second sum modulo 2 circuit is connected between the third and sixth stages of said shift register.

15. A binary sequence generator as defined in claim 14, wherein said third sum modulo 2 circuit is connected between the second and fifth stages of said shift register.

16. A binary sequence generator as defined in claim 15, wherein the multiplexing signal applied to said time multiplexer has a frequency 3F.

* * * * *